United States Patent [19]

Sato et al.

[11] Patent Number: 4,621,302

[45] Date of Patent: Nov. 4, 1986

[54] ELECTRICAL INSULATING OIL AND ELECTRICAL APPLIANCES IMPREGNATED WITH THE SAME

[75] Inventors: Atsushi Sato, Tokyo; Keiji Endo, Yokosuka; Shigenobu Kawakami, Ichikawa; Hitoshi Yanagishita; Shozo Hayashi, both of Yokohama, all of Japan

[73] Assignee: Nippon Petrochemicals Company, Limited, Tokyo, Japan

[21] Appl. No.: 711,155

[22] Filed: Mar. 13, 1985

[30] Foreign Application Priority Data

Mar. 14, 1984 [JP] Japan .................................. 59-48591

[51] Int. Cl.$^4$ .......................... H01G 4/22; H01B 3/22
[52] U.S. Cl. ................. 361/315; 174/17 LF; 174/25 C; 252/570; 336/58; 336/94; 361/327; 585/6.3; 585/6.6; 585/25; 585/26; 585/27; 585/435; 585/436
[58] Field of Search ...................... 585/6.3, 6.6, 25, 26, 585/27, 435, 436; 252/570; 174/17 LF, 25 C; 361/315, 327; 336/58, 94

[56] References Cited

U.S. PATENT DOCUMENTS

| | | | |
|---|---|---|---|
| 3,549,537 | 12/1970 | Brewster et al. | 585/6.3 |
| 3,577,476 | 5/1971 | Gurney et al. | 585/25 |
| 3,812,407 | 5/1974 | Nose et al. | 361/315 |
| 3,991,049 | 11/1976 | Siegrist et al. | 585/25 |
| 4,288,837 | 9/1981 | Nishimatsu et al. | 361/315 |
| 4,493,943 | 1/1985 | Sato et al. | 585/6.3 |
| 4,506,107 | 3/1985 | Sato et al. | 585/6.3 |

*Primary Examiner*—Paul Lieberman
*Assistant Examiner*—Robert A. Wax
*Attorney, Agent, or Firm*—Scully, Scott, Murphy & Presser

[57] ABSTRACT

An electrical insulating oil which is suitable for use in impregnating electrical appliances such as capacitors, cables and transformers, especially those in which plastic materials are used partially or totally as dielectrics or insulating materials, and electrical appliances that are impregnated with the above electrical insulating oil. The electrical insulating oil of the invention contains at least one monoolefin and/or diolefin having three condensed or non-condensed aromatic rings.

7 Claims, 1 Drawing Figure

ELECTRICAL INSULATING OIL AND ELECTRICAL APPLIANCES IMPREGNATED WITH THE SAME

BACKGROUND OF THE INVENTION

1. Field of the Invention

This invention relates to an improved electrical insulating oil which contains a monoolefin and/or diolefin having three aromatic rings, and electrical appliances impregnated with the same oil. More particularly, the electrical insulating oil of the invention is suitable for use in oil-filled electrical appliances such as oil-filled capacitors, especially those in which at least a part of dielectric or insulating material is made of plastics.

2. Description of the Prior Art

In recent years, the requirements for the performances of oil-filled electrical appliances such as capacitors are quite severe. They are required to be small in size, resistant to high voltages and long in life.

In order to meet these requirements, plastics having excellent dielectric strength are used for a part of or for the whole of dielectric materials or electrical insulating materials of oil-filled electrical appliances. That is, in oil-filled capacitors, plastic films made of polyolefins such as polypropylene and cross-linked polyethylene; polyester, polyvinylidene fluoride and polycarbonate are employed together with or in place of the conventional electrical insulating paper.

It is desired, accordingly, that some measures are taken also with respect to the electrical insulating oils that are used for impregnating these electrical appliances.

However, the conventionally used electrical insulating oils such as polybutenes and alkylbenzenes are not good in impregnating property to plastics. Furthermore, recently proposed diarylalkanes, alkylbiphenyls and alkylnaphthalenes are not always satisfactory because they cause the plastics to swell to some extent. In addition, further improvement in their impregnating property is demanded. In the case that an electrical insulating oil is not good in impregnating property to plastics or it causes the plastics to swell, voids (unimpregnated portions) are formed among film materials and electric fields converge on the voids. Accordingly, the corona discharge (partial discharge) characteristics such as corona starting voltage (CSV) and corona ending voltage (CEV) are lowered.

Disclosed in U.S. Pat. No. 4,347,169 are electrical insulating oils comprising diarylalkanes and linear unsaturated dimers of styrenes, and oil-filled electrical appliances impregnated with the same. The olefins disclosed here are only the compounds having two aromatic rings. These compounds are quite different from those of the present invention. In addition, when the compounds in the above reference are used for impregnating capacitors in which metallized films are wound, the performances of the impregnated capacitors are not always satisfactory.

BRIEF DESCRIPTION OF THE INVENTION

In view of the above-described conventional state of the art, it is the primary object of the present invention to provide an improved electrical insulating oil which is compatible with plastic materials, that leads to excellent corona discharge characteristics.

Another object of the present invention is to provide electrical appliances which are impregnated with the above electrical insulating oil and which have excellent electrical performances.

According to the present invention, the electrical insulating oil contains a monoolefin and/or diolefin having three condensed or non-condensed aromatic rings. Furthermore, with the electrical appliances of the invention that are impregnated with the above insulating oil, the sizes of appliances can be reduced, service life can be prolonged and electrical characteristics can be much improved.

BRIEF DESCRIPTION OF THE DRAWINGS

In order that the invention may be more fully understood, examples will be described with reference to the accompanying drawings in the latter part, in which.

DETAILED DESCRIPTION OF THE INVENTION

Figure 1:
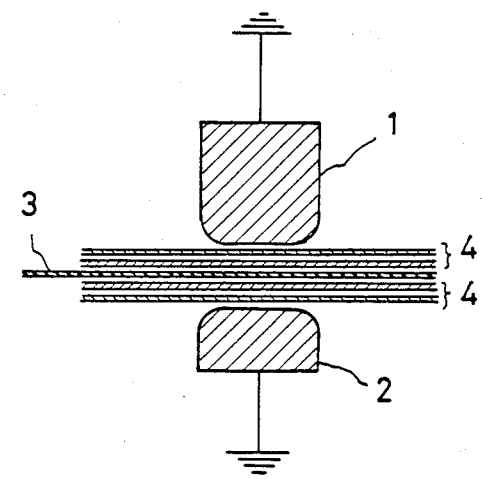
FIG. 1 is a schematic vertical cross-sectional view of a device for determining values of the corona starting voltages and corona ending voltages.

The olefins contained in the electrical insulating oil of the present invention have three aromatic rings which may be either condensed or non-condensed. The olefins can be either monoolefins or diolefins, or mixture of them. The olefins are preferably in liquid state, however, when they are used together with other electrical insulating oils by dissolving them into other electrical insulating oils, the olefins themselves can be solid at ordinary temperatures.

Accordingly, the molecular weights of the aromatic olefins are not especially restricted, however, they are generally not higher than 400 and preferably lower than 350. In the case that the molecular weight of an aromatic olefin exceeds 400, the olefin moiety in the olefin molecule decreases while aliphatic property of the molecule increases. Accordingly, it is not desirable because the swelling property of the aromatic olefin to plastics becomes intense and the viscosity becomes high.

The aromatic olefins according to the present invention do not cause the problem of public health hazard to occur because they do not contain any halogen atom, which fact is different from polychlorinated biphenyls (PCB). Furthermore, the aromatic olefins of the present invention are excellent in impregnating property to plastics such as polypropylene and they do not swell the plastics. Accordingly, when the electrical insulating oil of the invention is impregnated into oil-filled electrical appliances having plastic-made dielectrics or insulating materials, the corona discharge characteristics of the electrical appliances can be improved to a great degree.

The aromatic olefins contained in the electrical insulating oil of the invention will be described in more detail.

The aromatic olefins are exemplified by condensed tri-cyclic aromatic olefins represented by the following general formulae (I) and (II).

General Formula (I):

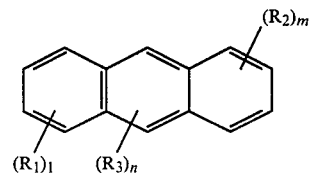

wherein each of $R_1$, $R_2$ and $R_3$ is a hydrogen atom or an aliphatic hydrocarbon group having 1 to 4 carbon atoms and having none of or one or two of ethylenically unsaturated double bonds, each of l and m is an integer from 0 to 3, n is an integer from 0 to 2, and the total number of ethylenically unsaturated double bonds in $R_1$ of 1 in number, $R_2$ of m in number and $R_3$ of n in number is 1 or 2.

The groups represented by the above $R_1$, $R_2$ and $R_3$ are exemplified by methyl, ethyl, propyl, isopropyl, n-butyl, isobutyl, sec-butyl, tert-butyl, vinyl, propenyl, isopropenyl, allyl, butenyl, butadienyl and the like.

The compounds represented by general formula (I) are exemplified by 1-vinylanthracene, 2-vinylanthracene, 9-vinylanthracene, 2-isopropenylanthracene, 9-propenyl-10-propylanthracene, 9,10-divinylanthracene, 9,10-diisopropenylanthracene and 9,10-diallylanthracene.

General Formula (II):

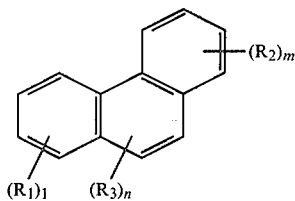

wherein each of $R_1$, $R_2$ and $R_3$ is a hydrogen atom or an aliphatic hydrocarbon group having 1 to 4 carbon atoms and having none of or one or two of ethylenically unsaturated double bonds, each of l and m is an integer from 0 to 3, n is an integer from 0 to 2, and the total number of ethylenically unsaturated double bonds in $R_1$ of 1 in number, $R_2$ of m in number and $R_3$ of n number is 1 or 2.

The groups represented by the above $R_1$, $R_2$ and $R_3$ are exemplified in the same manner as the groups of the general formula (I).

The compounds represented by general formula (II) are exemplified by 2-vinylphenanthrene, 3-vinylphenanthrene, 9-vinylphenanthrene and 3-isopropenylphenanthrene.

The aromatic olefins in the present invention also include arylnaphthalenes and aralkylnaphthalenes that are represented by the following general formula (III).

General Formula (III):

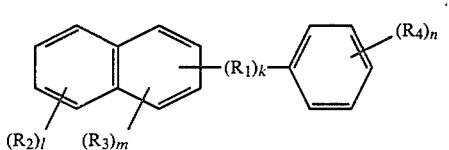

wherein $R_1$ is an aliphatic hydrocarbon group having 1 to 4 carbon atoms and having none of or one or two of ethylenically unsaturated double bonds, each of $R_2$ to $R_4$ is a hydrogen atom or an aliphatic hydrocarbon group having 1 to 4 carbon atoms and having none of or one or two of ethylenically unsaturated double bonds, k is 0 or 1, each of l, m and n is an integer from 0 to 3, and the total number of ethylenically unsaturated double bonds in $R_1$, $R_2$ of 1 in number, $R_3$ of m in number and $R_4$ of n in number is 1 or 2.

The groups represented by the above $R_2$, $R_3$ and $R_4$ are exemplified in the same manner as the groups of the general formula (I). The divalent group represented by the above $R_1$ is exemplified by those which are formed by removing two hydrogen atoms from the same or different carbon atoms of hydrocarbons such as methane, ethane, propane, butane, isobutane, ethylene, propylene, butene, isobutylene and butadiene.

The compounds represented by general formula (III) are exemplified by 1-phenyl-2-(1-naphthyl)ethylene, 1-phenyl-2-(2-naphthyl)ethylene, 1-phenyl-1-(1-naphthyl)ethylene, 1-phenyl-1-(2-naphthyl)ethylene, 1-phenyl-1-(1-naphthyl)propene, 1-phenyl-1-(2-naphthyl)propene, 1-phenyl-2-(2-naphthyl)propene and 1-(naphthyl)-2-o-tolylethylene.

Also included in the aromatic olefins of the present invention are triaryl, aralkyldiaryl or diaralkyl aromatic hydrocarbons represented by the following general formula (IV).

General Formula (IV):

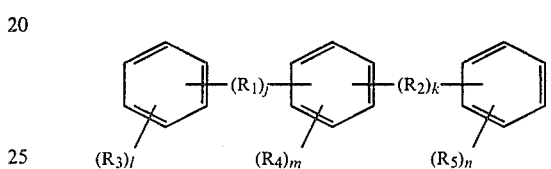

wherein each of $R_1$ and $R_2$ is an aliphatic hydrocarbon group having 1 to 4 carbon atoms and having none of or one or two of ethylenically unsaturated double bonds, each of $R_3$ to $R_5$ is a hydrogen atom or an aliphatic hydrocarbon group having 1 to 4 carbon atoms and having none of or one or two of ethylenically unsaturated double bonds, each of j and k is 0 or 1, each of l, m and n is an integer from 0 to 3, and the total number of ethylenically unsaturated double bonds in $R_1$, $R_2$, $R_3$ of 1 in number, $R_4$ of m in number and $R_5$ of n in number is 1 or 2.

The divalent groups represented by the above $R_1$ and $R_2$ are exemplified in the same manner as the divalent groups of general formula (III). The monovalent groups represented by the above $R_2$, $R_3$ and $R_4$ are exemplified in the same manner as the groups of the general formula (I).

The compounds represented by general formula (IV) are exemplified by 2-phenylstilbene, 4-phenylstilbene, 1-phenyl-1-biphenylylethylene, 4-benzylstilbene, 1-biphenyl-4-yl-1-p-tolylethylene, 1-biphenyl-4-yl-2-phenylpropene, 1-phenyl-2-(4-benzylphenyl)propene, 1-phenyl-1-(benzylphenyl)ethylene, 1-tolyl-1-(benzylphenyl)ethylene, 1-phenyl-1-(phenylethyl-phenyl)ethylene and bis(1-phenylethenyl)benzene.

Furthermore, triaryl alkanes and their derivatives represented by the following general formula (V) are also included in the aromatic olefins of the present invention.

General Formula (V):

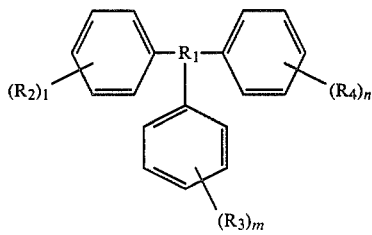

wherein $R_1$ is an aliphatic hydrocarbon group having 1 to 4 carbon atoms and having none of or one or two of ethylenically unsaturated double bonds, each of $R_2$ to $R_4$ is a hydrogen atom or an aliphatic hydrocarbon group having 1 to 4 carbon atoms and having none of or one or two of ethylenically unsaturated double bonds, each of l, m and n is an integer from 0 to 3, and the total number of ethylenically unsaturated double bonds in $R_1$, $R_2$ of l in number, $R_3$ of m in number and $R_4$ of n in number is 1 or 2.

The groups represented by the above groups $R_2$, $R_3$ and $R_4$ are exemplified by the groups of the general formula (I). The trivalent group represented by $R_1$ is exemplified by those which are formed by removing three hydrogen atoms from methane, ethane, propane, butane, isobutane, ethylene, propylene, butene, isobutylene, butadiene or the like.

The compounds represented by general formula (V) are exemplified by 1,1,2-triphenylethylene, 1,1,2-triphenylpropene, 1,1,3-triphenylbutene, 1,1-diphenyl-2-o-tolylethylene, 1,1-diphenyl-2-p-tolylethylene and 3,3,3-triphenylpropene-1.

The above aromatic olefins are typical examples of those which can be used for preparing the electrical insulating oil of the present invention, meanwhile the aromatic olefins are by no means restricted to these examples.

These aromatic olefins can be prepared by various chemical synthesis methods. For example, an alcohol is prepared by Grignard reaction which is followed by dehydration to obtain an olefin.

For instance, a Grignard reagent prepared from bromonaphthalene is reacted with acetophenone to obtain 1-phenyl-1-naphthylethanol which is then dehydrated to obtain 1-phenyl-1-naphthylethylene. Further, a Grignard reagent prepared from bromoanthracene is reacted with acetaldehyde to obtain hydroxyethylanthracene which is then dehydrated to obtain vinylanthracene.

Furthermore, the foregoing aromatic olefins can be prepared by dehydrogenating corresponding saturated aromatic hydrocarbons that have none or one of ethylenically unsaturated double bond.

That is, in the method to employ the dehydrogenation, saturated aromatic hydrocarbons having three condensed or non-condensed aromatic rings are dehydrogenated by using an appropriate dehydrogenation catalyst. Incidentally, diolefins can also be prepared from monoolefins. In the dehydrogenation, side reaction such as polymerization must be suppressed, however, if aromatic hydrocarbons having three condensed or non-condensed aromatic rings are produced, the side reaction such as decomposition is not objectionable.

The dehydrogenation catalysts are not limited but can be optionally selected from known ones. For example, one or a mixture of two kinds or more of oxides of metals such as Cr, Fe, Cu, K, Mg and Ca, and precious metals such as Pt and Pd, or these metal oxides or precious metals which are carried on a carrier such as alumina, are used.

The temperatures in dehydrogenation are in the range of 350° to 650° C. and preferably 400° to 600° C. The LHSV (liquid hourly space velocity) is in the range of 0.2 to 10, and preferably 0.5 to 3.0. Furthermore, it is possible to introduce steam, nitrogen or hydrogen gas into the reaction system in order to reduce partial pressure of the reactant and to avoid the deposition of carbon. If necessary, a proper diluent can also be used.

When the dehydrogenation is performed at a moderate dehydrogenation rate, starting materials themselves can act advantageously as diluents.

Through the above described dehydrogenation, vinylanthracene is produced from ethylanthracene; phenylnaphthylethylene, from phenylnaphthylethane; and phenylstilbene, from phenylbiphenylethane.

The aromatic olefins of the present invention can be used by mixing with other known electrical insulating oils at discretionary ratios according to required properties, as far as they are compatible with each other and dissolves together.

Such known electrical insulating oils are exemplified by mineral oils; olefin oligomers such as polybutene; alkylbenzenes such as dodecylbenzene; diarylalkanes such as 1-phenyl-1-xylylethane, 1-phenyl-2-(isopropylphenyl)ethane and benzyltoluene; diaralkyl aromatic hydrocarbons such as dibenzyltoluene; alkylbiphenyls such as monoisopropylbiphenyl; terphenyls and their partially nuclear-hydrogenated products; alkylnaphthalenes such as diisopropylnaphthalene; diaryl ethers such as ditolyl ether; diaralkyl ethers such as bis(α-methylbenzyl)ether; esters typically exemplified by phthalic esters such as dioctyl phthalate; animal and vegetable oils of triglycerides such as castor oil and cotton seed oil.

Furthermore, as the known electrical insulating oils, hydrogenated linear trimers of styrenes such as styrene and α-methylstyrene, aryl or aralkylnaphthalenes such as benzylnaphthalene and styrenated naphthalene, aryl or aralkylbephenyls such as terphenyl and benzylbiphenyl, diaralkylbenzenes such as benzyltoluene and distyrenated xylene, and their derivatives.

In addition, there are included the aromatic mono- or di-olefins having two aromatic condensed or noncondensed rings such as linear unsaturated dimers of styrene, α-methylstyrene, vinyltoluene, isopropyltoluene, diphenylethylene, 1-phenyl-1-tolylethylene, 1-phenyl-1-xylylethylene, stilbene and the like.

The molecular weights of aromatic olefins of the present invention are relatively high so that, even when they are liquid at ordinary temperatures, the viscosities of them are high. Even though required properties depend upon use conditions, electrical insulating oils of low viscosities are generally preferable. Especially when electrical insulating oils are used for impregnation, the low viscosity is required. Accordingly, in the present invention, when the foregoing aromatic olefins are used as electrical insulating oils, it is preferable that the electrical insulating oils of the invention are mixed with the above-described other electrical insulating oils.

The compounding ratios, especially the upper limit thereof, of the aromatic olefins can be determined in accordance with their degrees of compatibility and dissolving properties, and the viscosity of electrical insulating oil to be obtained. The ratio of the aromatic olefin is generally in the range of 0.1 to 40% by weight, preferably 1 to 30% by weight. If the quantity of the aromatic olefin is less than 0.1% by weight, the effect of addition of the aromatic olefin cannot be expected. While, if more than 40% by weight of the aromatic olefin is contained, the viscosity of obtained oil is too high which is not desirable.

Furthermore, known antioxidants for use in electrical insulating oils can be added to the insulating oil of the present invention. For example, there are phenol compounds such as 2,6-di-tert-butyl-p-cresol, 2,2'-methylenebis(4-methyl-6-tert-butylphenol), 4,4'- butylidenebis(3-methyl-6-tert-butylphenol), 4,4'-thiobis(3-methyl-6-tert-butylphenol), stearyl-β-3,5-di-tert-butyl-4-hydroxyphenol)propionate, tetrakis[methylene-3(3',5'-di-tert-butyl-4'-hydroxyphenyl)propionate]methane, 1,3,5-trimethyl-2,4,6-tris(3,5-di-tert-butyl-4-hydroxybenzyl)benzene, and 1,1,3-tris(2-methyl-4-hydroxy-5-tert-butylphenol)butane; sulfur compounds such as dilauryl thiodipropionate, distearyl thiodipropionate, laurylstearyl thiodipropionate, and dimyristyl thiodipropionate; and phosphorus compounds such as triisodecyl phosphite, diphenylisodecyl phosphite, triphenyl phosphite and trinonylphenyl phosphite.

These antioxidants can be added to the electrical insulating oil singly or in combination of two or more kinds. The addition quantity of the antioxidant is 0.001 to 5% by weight and preferably 0.01 to 2.0% by weight to the electrical insulating oil.

Furthermore, in order to impart to nonflammable property to the electrical insulating oil of the present invention, several known additives such as phosphoric esters and epoxy compounds may be added to the electrical insulating oil.

The electrical insulating oils containing the aromatic olefins of the present invention are non-halogenic and are suitable for use in general purposes. Particularly, it is advantageous for the impregnation of oil-filled electrical appliances such as electric capacitors, power cables and transformers.

As described in the foregoing, the requirements of high-voltage withstanding and size reduction for the oil-filled electrical appliances have become severe in recent years. In order to meet these requirements, plastics are used to replace either partially or totally the conventional insulating paper as insulating materials or dielectric materials for the oil-filled electrical appliances. More particularly, as electrical insulating materials (dielectric materials) for electrical capacitors, there are proposed the use of a combination of insulating paper and plastic films such as stretched or nonstretched polypropylene, polymethylpentene, or polyester film; the use of these plastic films singly; the use or embossed or roughened films of these plastic films to facilitate impregnation with the insulating oil; or the use of metallized plastic films, wherein the metallic layer serves as an electrode. Capacitors are made by winding these films together with an electrode material and impregnating them with the electrical insulating oil by conventional methods.

In the case of oil-filled cables, electrical insulating materials are made of polyolefin films such as cross-linked polyethylene film, stretched or nonstretched polypropylene film and polymethylpentene film; paper-polyolefin laminated film made by the melt-extrusion of these polyolefins into paper; composite film which is made by cross-linking insulating paper with silane-grafted polyethylene in the presence of a silanol condensation catalyst; or an artificial paper sheet which is made by mixing wood pulp and polyolefin fiber. Further, polyester and polyvinylidene fluoride are used as plastic films. Cables are made by winding tapes of these films around electric conductors such as copper pipes and impregnating them with electrical insulating oils by conventional methods.

The electrical insulating oil of the present invention is excellent in compatibility with plastic materials. Accordingly, the electrical insulating oil is quite suitable for use in impregnating oil-filled electrical appliances such as electric capacitors and electric cables in which plastic materials are used for either part or all of the insulating materials or dielectric materials.

More particularly, when an electric capacitor is provided with an insulating (dielectric) material that is partially or totally made of plastics, especially polyolefin, and when it is impregnated with the electrical insulating oil of the present invention, the insulating material can be fully and completely impregnated with the electrical insulating oil because swelling of the insulating material is slight, and voids (unimpregnated portions) are not formed. Accordingly, corona discharge due to the convergence of electric fields to the voids hardly occurs, and dielectric breakdown can be well avoided. Furthermore, the electrical insulating oil of the present invention has excellent hydrogen gas absorbing capacity and corona discharge resistance under which voltage stress, so that it is possible to obtain both a long service life and high-voltage use of the electrical appliances.

Similarly in the case of electric power cables, the change in dimensions of the insulating material due to swelling is small, and resistance to the insulating oil flow can be made very low so that oil impregnation can be completed in a short time. Of course, it should be understood that, because of the ease of impregnation, voids are hardly formed and the dielectric breakdown voltage becomes higher. When a cable is made by using an insulating material of a laminated film or composite film made of a plastic material and paper; peeling, creasing and buckling of the insulating material upon bending of the cable do not occur even when the insulating material has been in contact with the electrical insulating oil for a long time. Further, as in the case of the electric capacitors, power cables having good corona discharge resistance can be obtained due to the excellent hydrogen gas absorbing capacity of the electrical insulating oil. Accordingly, it is also possible in the power cables to obtain a long service life and high-voltage use, as for the capacitors.

In the following, the electrical insulating oil and electrical appliances impregnated therewith according to the present invention will be described in more detail with reference to several examples.

EXAMPLE

The electrical insulating oils of the present invention containing various aromatic olefins were prepared in accordance with the compositions shown in the following Table 1. Electrical characteristics of typical samples of them were determined and results of them are shown in the following Table 2.

In connection with the prepared electrical insulating oils, the values of CSV and CEV were obtained according to the following method. For comparison, similar tests were carried out in connection with electrical insulating oils of a single material such as phenylxylylethane, monoisopropylbiphenyl, diisopropylnaphthalene, dodecylbenzene and mineral oil. These results of the tests are shown in the following Table 3.

Determination of CSV and CEV

As shown in FIG. 1, a pair of two-ply stretched polypropylene films 4 (each consisting of 8 micron and 14 micron thick films, and 25 mm in width) were superposed on both sides of an aluminum foil 3 as an electrode (14 micron thick, 10 mm width). This was put between a pair of cylindrical electrodes 1 and 2 (25 mmφ) and the assembly thus composed was dipped into an electrical insulating oil to be tested. Both the electrodes 1 and 2 were grounded. Then an electric voltage was applied between the electrodes and the aluminum foil 3 and the electric voltage was gradually raised to determine CSV and CEV values.

Incidentally, in this method to determine CSV and CEV, the assemblies are composed of polypropylene films and aluminum foils. The conditions of electric charges in oil-filled electrical appliances such as oil-filled capacitors can be formed in a simplified mode and the characteristics of the oil-filled electrical appliances can be determined expediently.

TABLE 1

| | Compositions of Electrical Insulating Oils | | | |
|---|---|---|---|---|
| Ex. No. | Aromatic Olefins of This Invention | Wt. % | Other Electrical Insulating Oils | Wt. % |
| 1 | 9-Vinylanthracene | 10 | Phenylxylylethane | 90 |
| 2 | 9-Vinylanthracene | 20 | Phenylxylylethane | 80 |
| 3 | 9-Vinylanthracene | 10 | Monoisopropylbiphenyl | 90 |
| 4 | 9-Vinylanthracene | 10 | Diisopropylnaphthalene | 90 |
| 5 | 9-Vinylanthracene | 10 | Dodecylbenzene | 90 |
| 6 | 9-Vinylanthracene | 10 | Mineral Oil | 90 |
| 7 | 9-Vinylphenanthrene | 10 | Phenylxylylethane | 90 |
| 8 | 9-Vinylphenanthrene | 20 | Monoisopropylbiphenyl | 80 |
| 9 | 9-Vinylphenanthrene | 10 | Diisopropylnaphthalene | 90 |
| 10 | 9-Vinylphenanthrene | 10 | Dodecylbenzene | 90 |
| 11 | 9-Vinylphenanthrene | 10 | Mineral Oil | 90 |
| 12 | 1-Phenyl-1-(1-naphthyl)ethylene | 10 | Phenylxylylethane | 90 |
| 13 | 1-Phenyl-1-(1-naphthyl)ethylene | 10 | Monoisopropylbiphenyl | 90 |
| 14 | 1-Phenyl-1-(1-naphthyl)ethylene | 10 | Diisopropylnaphthalene | 90 |
| 15 | 1-Phenyl-1-(1-naphthyl)ethylene | 10 | Dodecylbenzene | 90 |
| 16 | 1-Phenyl-1-(1-naphthyl)ethylene | 10 | Mineral Oil | 90 |
| 17 | 1-Phenyl-1-benzylphenylethylene | 10 | Phenylxylylethane | 90 |
| 18 | 1-Phenyl-1-benzylphenylethylene | 10 | Monoisopropylbiphenyl | 90 |
| 19 | 1-Phenyl-1-benzylphenylethylene | 10 | Diisopropylnaphthalene | 90 |
| 20 | 1-Phenyl-1-benzylphenylethylene | 10 | Dodecylbenzene | 90 |
| 21 | 1-Phenyl-1-benzylphenylethylene | 10 | Mineral Oil | 90 |
| 22 | Bis(1-phenylethenyl)benzene | 10 | Phenylxylylethane | 90 |
| 23 | Bis(1-phenylethenyl)benzene | 10 | Monoisopropylbiphenyl | 90 |
| 24 | Bis(1-phenylethenyl)benzene | 10 | Diisopropylnaphthalene | 90 |
| 25 | Bis(1-phenylethenyl)benzene | 10 | Dodecylbenzene | 90 |
| 26 | Bis(1-phenylethenyl)benzene | 10 | Mineral Oil | 90 |
| 27 | 1,1,2-Triphenylpropene | 10 | Phenylxylylethane | 90 |
| 28 | 1,1,2-Triphenylpropene | 10 | Monoisopropylbiphenyl | 90 |
| 29 | 1,1,2-Triphenylpropene | 10 | Diisopropylnaphthalene | 90 |
| 30 | 1,1,2-Triphenylpropene | 10 | Dodecylbenzene | 90 |
| 31 | 1,1,2-Triphenylpropene | 10 | Mineral Oil | 90 |
| 32 | None | — | Phenylxylylethane | 100 |
| 33 | None | — | Monoisopropylbiphenyl | 100 |
| 34 | None | — | Diisopropylnaphthalene | 100 |
| 35 | None | — | Dodecylbenzene | 100 |
| 36 | None | — | Mineral Oil | 100 |

TABLE 2

| | Electrical Characteristics | | | |
|---|---|---|---|---|
| Ex. No. | Dielectric Breakdown Voltage (kV/2.5 mm) | Specific Volume Resistivity ($\Omega$.cm @ 80° C.) | Dielectric Loss Tangent (% @ 80° C.) | Dielectric Constant |
| 1 | 70 or above | $1.1 \times 10^{16}$ | 0.002 | 2.6 |
| 2 | 70 or above | $1.0 \times 10^{16}$ | 0.003 | 2.7 |
| 3 | 70 or above | $5.5 \times 10^{15}$ | 0.004 | 2.6 |
| 4 | 70 or above | $5.0 \times 10^{15}$ | 0.004 | 2.6 |
| 5 | 70 or above | $9.8 \times 10^{15}$ | 0.003 | 2.3 |
| 6 | 70 or above | $1.0 \times 10^{16}$ | 0.004 | 2.3 |
| 7 | 70 or above | $1.0 \times 10^{16}$ | 0.002 | 2.6 |
| 12 | 70 or above | $1.2 \times 10^{16}$ | 0.003 | 2.6 |
| 17 | 70 or above | $1.0 \times 10^{16}$ | 0.004 | 2.6 |
| 22 | 70 or above | $1.0 \times 10^{16}$ | 0.003 | 2.5 |
| 27 | 70 or above | $1.1 \times 10^{16}$ | 0.003 | 2.5 |

TABLE 3

| | CSV and CEV | |
|---|---|---|
| Example No. | C S V (Volts) | C E V (Volts) |
| 1 | 4,400 | 3,600 |
| 2 | 4,500 | 3,800 |
| 3 | 4,300 | 3,400 |
| 4 | 4,100 | 2,800 |
| 5 | 4,000 | 2,500 |
| 6 | 3,800 | 1,900 |
| 7 | 4,400 | 3,600 |
| 8 | 4,400 | 3,400 |
| 9 | 4,100 | 2,700 |
| 10 | 4,000 | 2,500 |
| 11 | 3,600 | 1,800 |
| 12 | 4,400 | 3,700 |
| 13 | 4,300 | 3,300 |
| 14 | 4,000 | 2,700 |
| 15 | 3,900 | 2,500 |
| 16 | 3,700 | 1,800 |
| 17 | 4,400 | 3,600 |
| 18 | 4,200 | 3,300 |
| 19 | 4,000 | 2,800 |
| 20 | 4,000 | 2,400 |
| 21 | 3,700 | 1,700 |
| 22 | 4,500 | 3,700 |
| 23 | 4,400 | 3,500 |
| 24 | 4,200 | 2,800 |
| 25 | 4,000 | 2,400 |
| 26 | 3,700 | 1,700 |
| 27 | 4,400 | 3,700 |
| 28 | 4,300 | 3,400 |
| 29 | 4,200 | 2,800 |
| 30 | 3,900 | 2,300 |
| 31 | 3,700 | 1,700 |
| 32 | 3,900 | 3,200 |
| 33 | 3,900 | 3,100 |
| 34 | 3,800 | 2,500 |
| 35 | 3,800 | 2,800 |
| 36 | 3,500 | 1,300 |

What is claimed is:

1. An electrical appliance comprising dielectric or insulating material, and wherein at least a part of said dielectric or insulating material is made of insulating plastim film, and wherein said electrical appliance is impregnated with an electrical insulating oil containing composition comprising: (a) 0.1 to 40% by weight of monoolefin or diolefin having three condensed or non-condensed aromatic rings selected from the following General Formulae (I), (II) and (V) and, (b) 99.9 to 60% by weight of other electrical insulating oil, wherein said (a) and (b) are the only electrical insulating oil components of said composition;

General Formula (I):

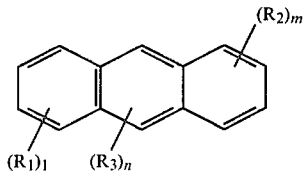

wherein each of $R_1$, $R_2$ and $R_3$ is a hydrogen atom or an aliphatic hydrocarbon group having 1 to 4 carbon atoms and having none of or one or two of ethylenically unsaturated double bonds, each of 1 and m is an integer from 1 to 3, n is an integer from 0 to 2, and the total number of ethylenically unsaturated double bond in $R_1$ of 1 in number, $R_2$ of m in number and $R_3$ of n in number is 1 or 2, General Formula (II):

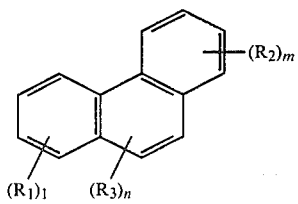

wherein each of $R_1$, $R_2$ and $R_3$ is a hydrogen atom or an aliphatic hydrocarbon group having 1 to 4 carbon atoms and having none of or one or two ethylenically unsaturated double bonds, each of 1 and m is an integer from 0 to 3, n is an integer from 1 to 2, and the total number of ethylenically unsaturated double bonds in $R_1$ of 1 in number, $R_2$ of m in number and $R_3$ of n in number is 1 or 2, and General Formula (V):

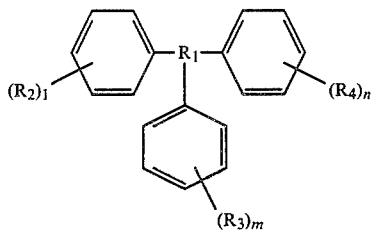

wherein $R_1$ is an aliphatic hydrocarbon group having 1 to 4 carbon atoms and having none of or one or two of ethylenically unsaturated double bonds, each of $R_2$ to $R_4$ is a hydrogen atom or an aliphatic hydrocarbon group having 1 to 4 carbon atoms and having none of or one or two of ethylenically unsaturated double bonds, each of 1, m and n is an integer from 0 to 3, and the total number of ethylenically unsaturated double bonds in $R_1$ and $R_2$ of 1 in number, $R_3$ of m in number and $R_4$ of n in number is 1 or 2.

2. The electrical appliance of claim 1, wherein said insulating plastic film is a polyolefin film.

3. The electrical appliance in claim 2, wherein said polyolefin film is a polypropylene film.

4. The electrical appliance in claim 1, wherein the molecular weights of said monoolefin and diolefin are not higher than 400.

5. The electrical appliance in claim 1, wherein said electrical appliance is an oil-impregnated capacitor.

6. The electrical appliance in claim 5, wherein said oil-impregnated capacitor is made by winding a film or films with an electrode material.

7. An electrical insulating oil composition comprising
(a) 0.1 to 40% by weight of monoolefin or diolefin having three condensed or non-condensed aromatic rings selected from the group consisting of olefins which are represented by one of the following General Formulae (I), (II) and (V), and
(b) 99.9 to 60% by weight of other electrical insulating oil, wherein said (a) and (b) are the only electrical insulating oil components of said composition;

General Formula (I):

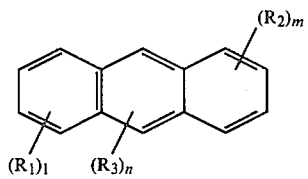

wherein each of $R_1$, $R_2$ and $R_3$ is a hydrogen atom or an aliphatic hydrocarbon group having 1 to 4 carbon atoms and having none of or one or two of ethylenically unsaturated double bonds, each of 1 and m is an integer from 0 to 3, n is an integer from 0 to 2, and the total number of ethylenically unsaturated double bonds in $R_1$ of 1 in number, $R_2$ of m in number and $R_3$ of n in number is 1 or 2, General Formula (II):

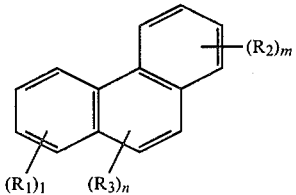

wherein each of $R_1$, $R_2$ and $R_3$ is a hydrogen atom or an aliphatic hydrocarbon group having 1 to 4 carbon atoms and having none of or one or two of ethylenically unsaturated double bonds, each of 1 and m is an integer from 0 to 3, n is an integer from 0 to 2, and the total number of ethylenically unsaturated double bonds in $R_1$ of 1 in number, $R_2$ of m in number and $R_3$ of n in number is 1 or 2, and General Formula (V):

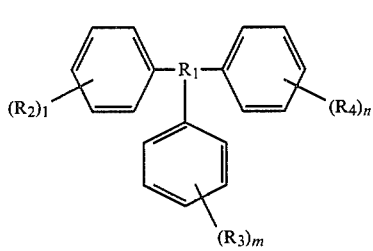

wherein $R_1$ is an aliphatic hydrocarbon group having 1 to 4 carbon atoms and having none of or one or two of ethylenically unsaturated double bonds, each of $R_2$ to $R_4$ is a hydrogen atom or an aliphatic hydrocarbon group having 1 to 4 carbon atoms and having none of or one or two of ethylenically unsaturated double bonds, each of 1, m and n is an integer from 0 to 3, and the total number of ethylenically unsaturated double bonds in $R_1$ and $R_2$ of 1 in number, $R_3$ of m in number and $R_4$ of n in number is 1 or 2.

* * * * *